(12) United States Patent
Campagnac et al.

(10) Patent No.: US 11,804,986 B2
(45) Date of Patent: Oct. 31, 2023

(54) METHOD FOR THE REMOTE MANAGEMENT OF A DEVICE CONNECTED TO A RESIDENTIAL GATEWAY

(71) Applicant: SAGEMCOM BROADBAND SAS, Rueil Malmaison (FR)

(72) Inventors: Isabelle Campagnac, Rueil Malmaison (FR); Fabrice Cluzeau, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 16/764,213

(22) PCT Filed: Nov. 20, 2018

(86) PCT No.: PCT/EP2018/081916
§ 371 (c)(1),
(2) Date: May 14, 2020

(87) PCT Pub. No.: WO2019/101736
PCT Pub. Date: May 31, 2019

(65) Prior Publication Data
US 2020/0396105 A1 Dec. 17, 2020

(30) Foreign Application Priority Data
Nov. 24, 2017 (FR) ...................... 1761160

(51) Int. Cl.
*H04L 12/66* (2006.01)
*H04L 67/00* (2022.01)
*H04L 67/563* (2022.01)

(52) U.S. Cl.
CPC .............. *H04L 12/66* (2013.01); *H04L 67/34* (2013.01); *H04L 67/563* (2022.05)

(58) Field of Classification Search
CPC ...... H04L 12/66; H04L 67/2814; H04L 67/34
See application file for complete search history.

(56) References Cited

U.S. PATENT DOCUMENTS 8,739,243 B1 * 5/2014 Martini ................. H04L 63/306
726/1
8,910,252 B2 * 12/2014 Gu ...................... H04L 63/1466
380/278

(Continued)

FOREIGN PATENT DOCUMENTS

EP          2595078 A1 *  5/2013
WO    2008/055081 A2     5/2008

(Continued)

OTHER PUBLICATIONS

Mar. 13, 2019 Search Report issued in International Patent Application No. PCT/EP2018/081916.

*Primary Examiner* — Shean Tokuta
(74) *Attorney, Agent, or Firm* — Williams Mullen; R. Brian Drozd

(57) ABSTRACT

A method is provided for the remote management of a device connected to a residential gateway, including, when performed by the gateway: intercepting a request coming from the device including an address of a first server for which the request is intended, the purpose of the request being to obtain an address of a second server with which the device must be connected; determining a processing operation to be applied to the request, an identifier of the device contained in the request and configuration information obtained from an operator, the configuration information including information representing a set of devices, the plurality of processing operations including a processing operation applied when the device belongs to the set, including responding to the request without contributing the first server. When the processing to be applied is a redirection, a (Continued)

response is provided to the request containing the address of the second server.

8 Claims, 3 Drawing Sheets

(56) References Cited

U.S. PATENT DOCUMENTS

| | | | | |
|---|---|---|---|---|
| 8,972,968 | B1* | 3/2015 | Vichare | G06F 8/65 |
| | | | | 717/170 |
| 9,680,801 | B1 | 6/2017 | Martini | |
| 10,257,028 | B2* | 4/2019 | Kreet | H04L 41/0803 |
| 10,430,263 | B2* | 10/2019 | Polar Seminario | H04L 67/34 |
| 10,779,141 | B2* | 9/2020 | Conan | H04W 4/50 |
| 2009/0201830 | A1* | 8/2009 | Angelot | H04L 12/66 |
| | | | | 370/254 |
| 2010/0142523 | A1* | 6/2010 | Ohman | H04L 12/2869 |
| | | | | 370/389 |
| 2013/0013752 | A1* | 1/2013 | Herrera Van Der Nood | |
| | | | | H04L 41/0886 |
| | | | | 709/220 |
| 2013/0041972 | A1* | 2/2013 | Field | H04L 67/288 |
| | | | | 709/213 |
| 2014/0143674 | A1* | 5/2014 | Kruglick | G06F 3/0484 |
| | | | | 715/738 |
| 2014/0258441 | A1* | 9/2014 | L'Heureux | H04L 12/66 |
| | | | | 709/217 |
| 2015/0052345 | A1* | 2/2015 | Martini | H04L 67/01 |
| | | | | 713/150 |
| 2016/0173447 | A1* | 6/2016 | Achim | H04L 63/1408 |
| | | | | 726/11 |
| 2017/0208418 | A1* | 7/2017 | Conan | H04W 4/50 |
| 2018/0213296 | A1* | 7/2018 | Kellar | H04L 65/70 |
| 2020/0396105 | A1* | 12/2020 | Campagnac | H04L 67/34 |

FOREIGN PATENT DOCUMENTS

| | | | | |
|---|---|---|---|---|
| WO | 2016/093724 A1 | 6/2016 | | |
| WO | WO-2019101736 A1 * | 5/2019 | | H04L 12/66 |

* cited by examiner

METHOD FOR THE REMOTE MANAGEMENT OF A DEVICE CONNECTED TO A RESIDENTIAL GATEWAY

The present invention relates to a method for the remote management of a device connected to a local network, said local network being connected to an internet network by means of a residential gateway, and equipment implementing the method.

Many devices currently embed software that can, and even must, be updated regularly in order to offer new functionalities to the users, to improve the functioning of these devices or to correct software design faults (bugs). This is the case in particular with smartphones, tablets, computers, digital television sets, etc., which are frequently updated. DECT (Digital Enhanced Cordless Telecommunication) devices complying with ETSI TS 102 527 are not free from this updating requirement.

The DECT standard affords short-range communications in a business or in a home. A DECT device may however communicate at long distance provided that it is connected, for example by a wireless connection, to equipment, such as a residential gateway, hereinafter simply called a gateway. A gateway allows a transfer of data coming from the DECT device on a wide area network (WAN) such as the internet. Thus two DECT devices situated in different DECT networks, each connected to the internet by means of a gateway, can communicate. It is then said that each gateway serves as an interface between a "DECT world" representing a local area network (LAN) and DECT devices and an "IP world" representing the internet.

Part 4 of ETSI TS 102 527 (ETSI TS 102 527-4), also known as DECT CAT-iq data ("Cordless Advanced Technology—internet and quality—data") gives means for updating a DECT device. These means are often grouped together under the acronym SUOTA ("Software Update Over The Air").

The DECT CAT-iq data standard defines a concatenation of operations and commands for performing update operations (i.e. operations of the SUOTA type). A DECT device wishing to perform an update sends a series of requests to a gateway, which formats them in order to be able to transmit these requests by means of the internet to a management server situated outside the DECT network.

FIG. 4 illustrates schematically a method of the prior art for updating a DECT device.

The method in FIG. 4 is a conventional application of the DECT CAT-iq standard. In a step 40, the gateway intercepts a first request containing a command CMBS_EV_DSR_SUOTA_HS_VERSION_INDICATION and a second request comprising a command CMBS_EV_DSR_SUOTA_URL_RECEIVED. The first request further comprises:

- so-called FMC ("Equipment Manufacturer Code") information equal to a value emc supplying an identifier of the DECT device,
- so-called SWvid ("Software Version ID") information equal to a value swvid supplying an identifier of a version of the software of the DECT device, and
- so-called HWvid ("Hardware Version ID") information equal to a value hwvid supplying an identifier of a hardware version of the DECT device.

The second request further comprises an address called URL indication ("Uniform Resource Locator") of the management server equal to a value url.

In a step 41, the gateway formats the information received in an HTTP ("HyperText Transfer Protocol") request, i.e. the gateway constructs a URL FP_URL1 such that:

FP_URL1=url?EMC=emc?SWvid=swvid?HWvid=hwvid

In a step 42, the gateway transmits the request thus constructed (by an HTTP GET command) to the management server (i.e. to the destination indicated by the URL FP_URL1.

In a step 43, the gateway receives a response from the management server (in the form of an HTTP 200 OK command) containing an identifier SW_UPDATE_vid of software to be downloaded in order to perform the update, and a URL FP_URL2 corresponding to the address of the software to be downloaded (i.e. the address of a downloading server capable of providing the required update of the software).

In a step 44, the gateway transmits the identifier of the software to be downloaded in order to perform the update and the URL FP_URL2 respectively in a command CMBS_EV_DSR_SUOTA_SEND_VERS_AVAIL_RES and in a command CMBS_EV_DSR_SUOTA_SEND_URL_RES.

In a step 45, the gateway intercepts a third request coming from the DECT device containing a command intended to download a version of the software the identifier of which is SW_UPDATE_vid at the address FP_URL2.

In a step 46, the gateway formats this request in the form of an HTTP GET command and transmits it to the address indicated in a step 47.

It should therefore be noted that, in the method in FIG. 4, the gateway has a relatively passive role since it merely formats information coming from the DECT device in order to be able to transmit it over the internet. Moreover, the gateway transmits each request to servers (the management server and the download server) defined by the DECT device. However, each of these servers might not have been approved by the operator of the gateway. It could be envisaged in fact that an operator might define servers to be used for reasons of reliability, security or cost.

It is desirable to overcome these drawbacks of the prior art. It is in particular desirable to propose a method that enables a gateway to control which servers must be used by a DECT device using said gateway for communicating outside its DECT network.

It is also desirable to provide a solution that is simple to implement at low cost.

According to a first aspect of the present invention, the present invention relates to a method for the remote management of a device connected to a local area network, said local area network being connected to an internet network by means of a residential gateway, referred to as a gateway. The method comprises, when it is executed by the gateway: intercepting a first request coming from the device comprising an address of a first server for which the first request is intended, the purpose of the first request being to obtain an address of a second server with which the device must be connected; analysing said first request in order to obtain at least one identifier of the device; determining a processing operation to be applied to said first request, from among a plurality of processing operations, according to the identifier of the device and configuration information obtained from an operator, said configuration information comprising information representing a set of devices, the plurality of processing operations comprising a processing operation, called redirection, applied when the device belongs to said set of devices consisting of responding to the first request without contributing the first server; when the processing operation to be applied is a redirection, supplying to said device a response to said first request containing the address of the second server so that the device can connect with the second server.

According to one embodiment, the plurality of processing operations comprise two types of redirection, a local redirection and a remote redirection, in the local redirection the gateway has knowledge of the address of the second server and generates its response using this address, in the remote redirection the gateway generates a second request containing the information contained in the first request, transmits the second request to a third server different from the first server, receives a response containing the address of the second server from the third server and generates its response using this address.

According to one embodiment, the plurality of processing operations further comprise a processing operation, called default processing, to be applied when the device does not belong to said set of devices, the default processing consisting of generating a third request from the information contained in the first request, transmitting the third request to the first server, and then supplying to said device a response to said first request containing an address of a fourth server supplied by the first server so that the device can connect with the fourth server, or consisting of transmitting a response to the device indicating that the first request cannot be dealt with.

According to one embodiment, the first request is a request to update software of the device, a redirection or a default processing being applied after verification that the gateway is able to manage update requests emanating from said device, the plurality of processing operations comprising transmitting a response to the device indicating that the first request cannot be dealt with when the gateway is not able to process update requests emanating from said device.

According to one embodiment, when the gateway is able to manage update requests emanating from said device, the gateway checks, using information that was previously supplied to it by the operator, that an update of the software is available, performs a redirection when an update is available or transmits a response to the device indicating that no update is available.

According to one embodiment, the device is a device implementing the DECT CAT iq data standard and communicating with the gateway in accordance with this standard.

According to a second aspect of the invention, the invention relates to a device included in a residential gateway, referred to as a gateway, interconnecting a local network to an internet network. The device comprises: interception means for intercepting a first request coming from a second device in the local network, said request comprising an address of a first server for which the first request is intended, the purpose of the first request being to obtain an address of a second server with which the second device must be connected; analysis means for analysing said first request in order to obtain at least one identifier of the second device; determination means for determining a processing operation to be applied to said first request among a plurality of processing operations, according to the identifier of the second device and configuration information obtained from an operator, said configuration information comprising information representing a set of second devices, the plurality of processing operations comprising a processing operation, called redirection, applied when the second device belongs to said set of second devices consisting of responding to the request without contributing the first server; supply means for supplying to said second device a response to said first request containing the address of the second server so that the second device can connect with the second server.

According to a third aspect of the invention, the invention relates to a residential gateway comprising a device according to the second aspect.

According to a fourth aspect, the invention relates to a computer program, comprising instructions for implementing, by a device, the method according to the first aspect when the program is executed by a processor of said device.

According to a fifth aspect, the invention relates to storage means, storing a computer program comprising instructions for implementing, by a device, the method according to the first aspect when said program is executed by a processor of said device.

The features of the invention mentioned above, as well as others, will emerge more clearly from a reading of the following description of an example embodiment, said description being given in relation to the accompanying drawings, among which:

Hereinafter, the invention is described in a context of updating a DECT device such as a telephone, said telephone being connected to a gateway managed by an operator. The invention is however also applicable in other contexts. The invention is, for example, applicable to any device situated in a local area network, referred to as a local device, and having to communicate with a server situated outside the local area network by means of a gateway. The invention is adapted to any local device, other than a DECT device, such as a computer, a television set, etc., having to make updates, the updates being stored on a remote server. The invention is also addressed to local devices making requests for consumables to a server and for which the operator responsible for the gateway wishes to define the server to which the local device must apply in order to obtain the consumables. The invention can for example be adapted to printers making requests for paper or ink cartridges, or to automatic drinks, snacks or sandwich dispensers making restocking requests to a server.

Figure 1:
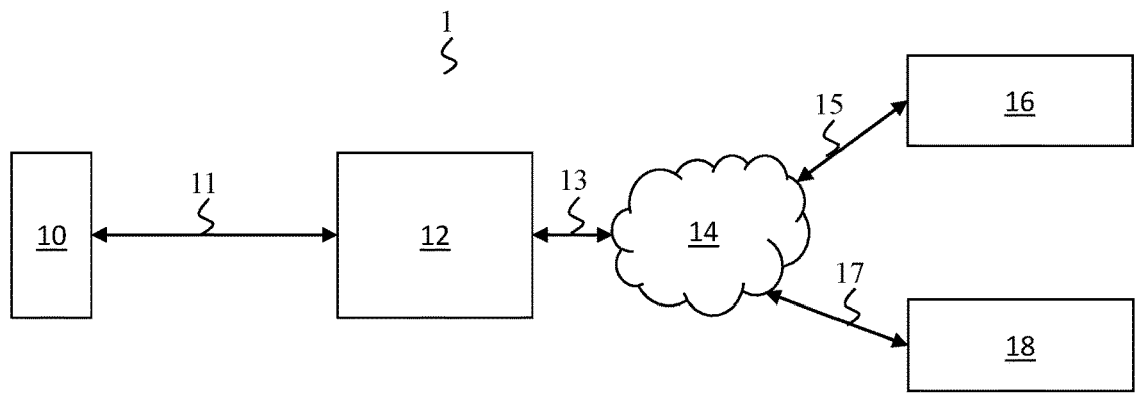
FIG. 1 illustrates schematically an example of a system wherein the invention is implemented.

FIG. 1 illustrates schematically an example of a system 1 wherein the invention is implemented.

The system 1 comprises a DECT device 10, such as a cordless telephone connected to a gateway 12 by means of a local area network LAN of the DECT type, referred to as a DECT network 11. The gateway 12 connects the DECT network 11 to a WAN network of the internet type, referred to as an internet network 14, by means of a connection 13. A plurality of servers are connected to the internet network 14, including a management server 16 by means of a connection 15 and a download server 18 by means of a connection 17.

Figure 2:
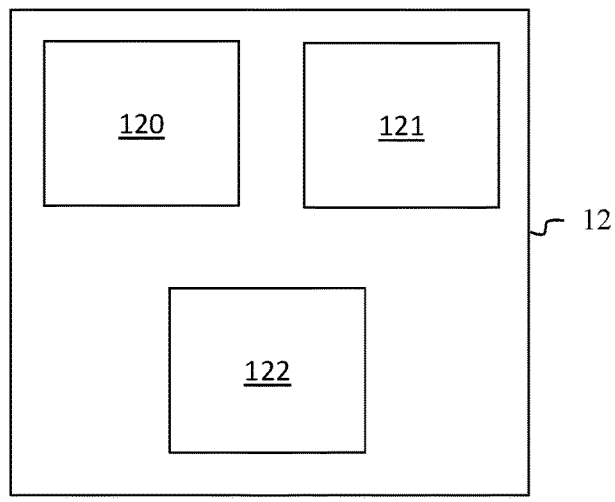
FIG. 2 illustrates schematically an example of a residential gateway.

FIG. 2 illustrates schematically an example of a gateway 12.

The gateway 12 comprises a DECT module 120 able to communicate with DECT devices, such as the DECT device 10, a WAN module 122 able to communicate with devices connected to the internet network 14 such as the management server 16 and the download server 18, and a processing module 121 able in particular to implement the invention and to fulfil a role of interface between the DECT module 120 and the WAN module 122.

Figure 3:
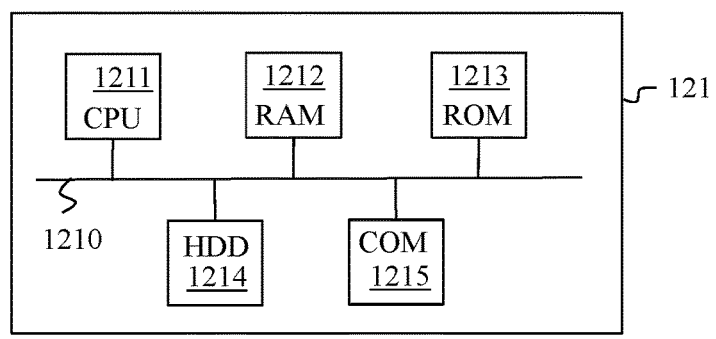
FIG. 3 illustrates schematically an example of hardware architecture of a processing module included in a residential gateway.

FIG. 3 illustrates schematically an example of hardware architecture of the processing module 121 included in the gateway 12. The processing module 121 then comprises, connected by a communication bus 1210: a processor or CPU (central processing unit) 1211; a random access memory RAM 1212; a read only memory ROM 1213; a storage unit or a storage medium reader, such as an SD (Secure Digital) card reader 1214; a set of communication interfaces 1215 enabling the processing module 121 to communicate with other modules of the gateway 12, including the DECT module 120 and the WAN module 122. The set of communication interfaces 1215 in particular enables the processing module 121 to exchange requests and messages with on the one hand the DECT device 10 by means of the DECT module 120 and with the servers 16 and 18 by means of the WAN module 122.

The processor 1211 is capable of executing instructions loaded in the RAM 1212 from the ROM 1213, from an external memory (not shown), from a storage medium, such as an SD card, or from a communication network. When the gateway 12 is powered up, the processor 1211 is capable of reading instructions from the RAM 1212 and executing them. These instructions form a computer program causing the implementation, by the processor 1211, of the method described in relation to FIGS. 5 and 6.

Figure 5:
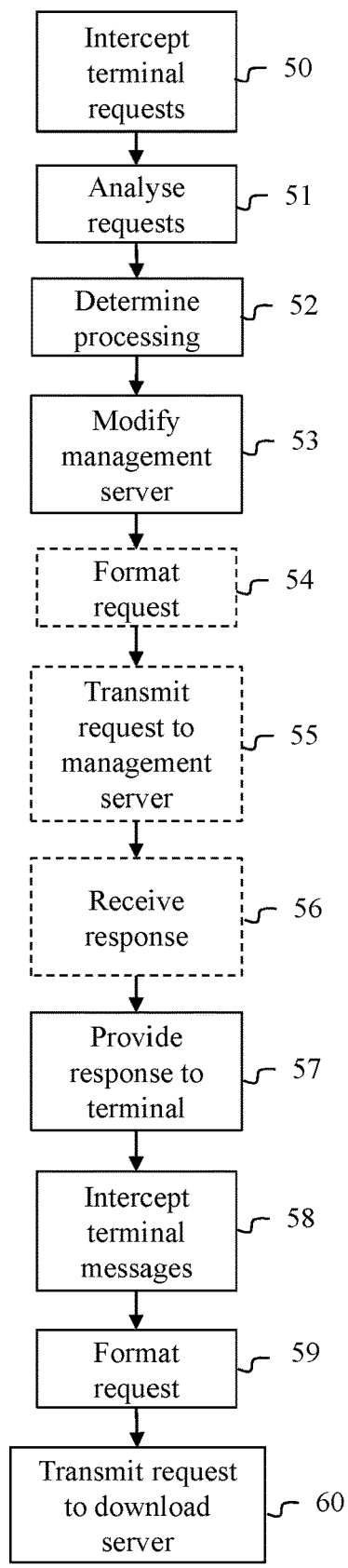
FIG. 5 illustrates schematically an example of a method for updating a DECT device according to the invention.
Figure 6:
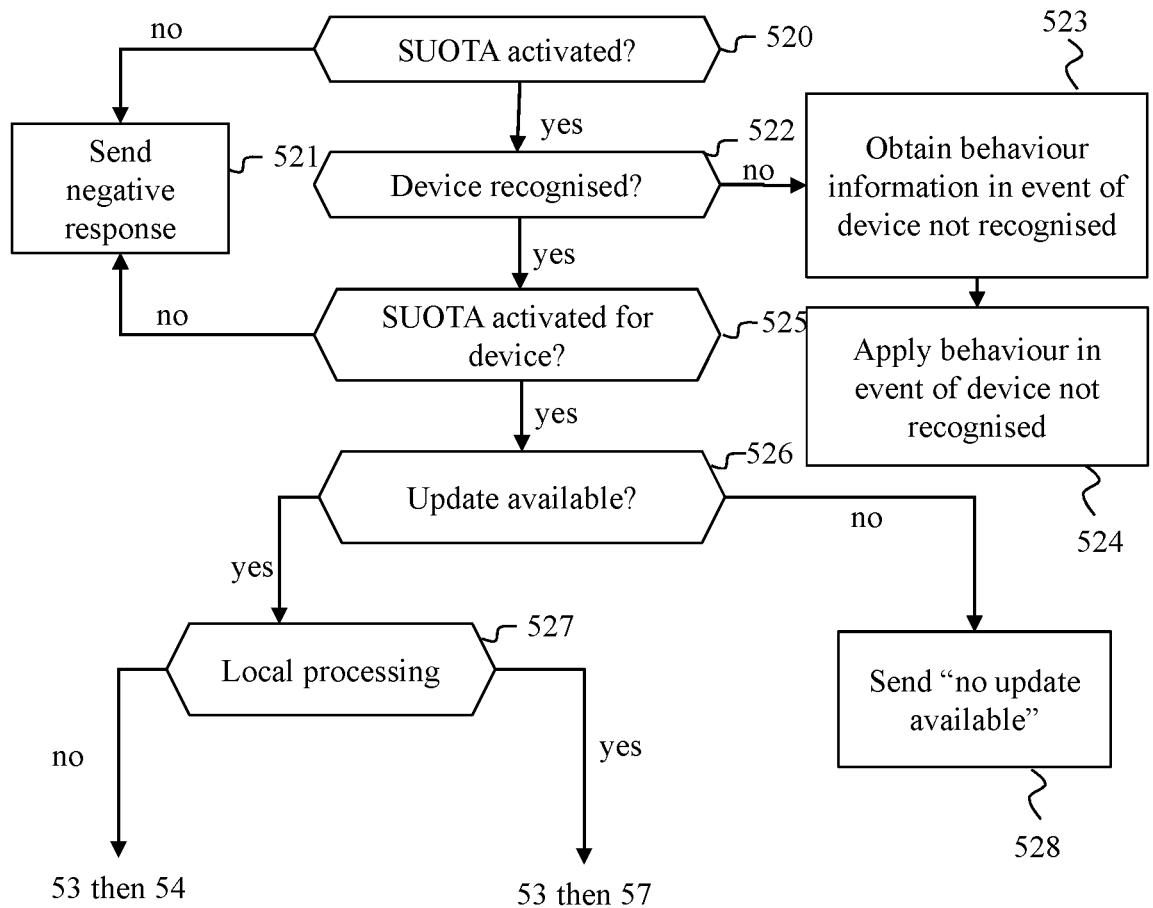
FIG. 6 illustrates schematically a detail of a step of the method for updating a DECT device according to the invention.

All or part of the method described in relation to FIGS. 5 and 6 can be implemented in software form by the execution of a set of instructions by a programmable machine, such as a DSP (digital signal processor) or a microcontroller, or be implemented in hardware form by a machine or a dedicated component, such as an FPGA (field-programmable gate array) or an ASIC (application-specific integrated circuit).

FIG. 5 illustrates schematically an example of a method for updating a DECT device 10 according to the invention.

Figure 4:
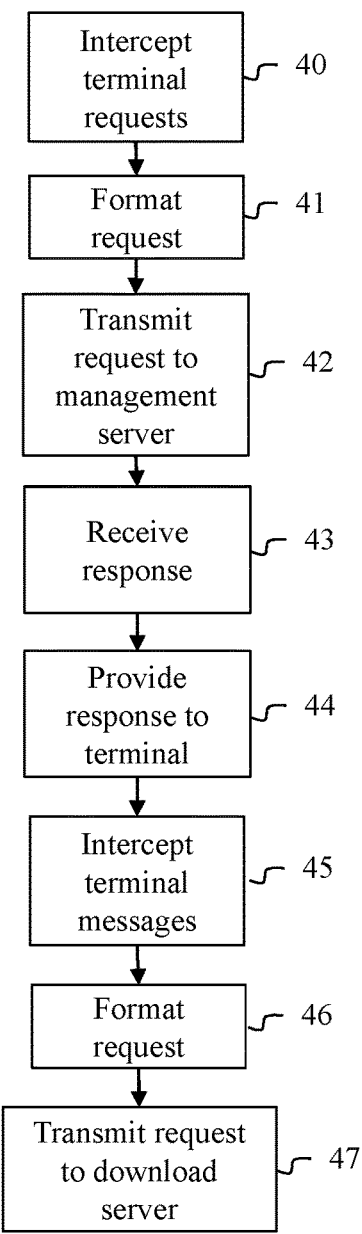
FIG. 4 illustrates schematically a method of the prior art for updating a DECT device.

The method described in relation to FIG. 5 differs from the method of the prior art described in relation to FIG. 4 in that the gateway 12 has the possibility of modifying both the management server and the download server to which the DECT device 10 applies. The method in FIG. 5 therefore modifies the conventional functioning of the DECT CAT-iq standard.

In a step 50, similar to the step 40, the processing module 121 intercepts a first request containing a command CMBS_EV_DSR_SUOTA_HS_VERSION_INDICATION and a second request comprising a command CMBS_EV_DSR_SUOTA_URL_RECEIVED. The content of the first and second requests is identical to that described in relation to step 40. The second request therefore comprises an address of a management server for which the first request is intended, and the purpose of the set consisting of the first and second requests is to obtain an address of a download server with which the DECT device 10 is to be connected.

In a step 51, the processing module 121 analyses the first request in order to obtain at least one identifier of the device 10. In one embodiment, the processing module 121 obtains the value emc of the information FAMC, the value swvid of the information SWvid and the value hwvid of the information HWvid.

In a step 52, the processing module 121 determines a processing operation to be applied to said first request, from among a plurality of processing operations, according to the identifier of the DECT device 10 and configuration information obtained from an operator responsible for the gateway 12. The configuration information comprises information representing a set of DECT devices recognised by the processing module. The plurality of processing operations comprises a processing operation, called redirection, applied when the device belongs to said set of devices, consisting of responding to the request without contributing the first server.

The configuration information was supplied by the operator responsible for the gateway 12 using a protocol of the TR-069 type. The TR-069 protocol was defined in order to manage communications between terminal equipment (such as a gateway) situated in a LAN and a server situated on a WAN. It offers an operator a set of administration, control and diagnostic services.

In one embodiment, the operator responsible for the gateway 12 updates the configuration information either at predefined regular intervals or as soon as a new version of software of one of the DECT devices referenced in the information representing the set of DECT devices recognised by the processing module 121 is available or as soon as a change in the configuration information occurs (for example when a new DECT device is added to the set of DECT devices recognised by the processing module 121).

FIG. 6 illustrates the step 52 schematically in detail.

In a step 520, the processing module 121 determines whether it is implementing an update functionality of the SUOTA type. If not, it sends a negative response to the DECT device 10 in a step 521. In this case, the DECT device 10 cannot be updated by means of the gateway 12.

If the processing module 121 is implementing an update functionality of the SUOTA type, in a step 522 the processing module 121 determines whether it recognises the DECT device 10. To do this, it determines, by comparing the value emc, the value hwvid and the value swvid with the information representing the set of DECT devices, whether the DECT device 10 is represented in said set. This is because these three items of information are used to identify the DECT device 10.

If the DECT device 10 is not recognised, the processing module 121 obtains, in a step 523, information representing a behaviour to be adopted in the event of non-recognition of a DECT device. This information representing a behaviour to be adopted was supplied by the operator responsible for the gateway 12 using the TR-069 protocol. Several types of behaviour can be defined by the operator. In one embodiment, the behaviour to be adopted in the event of non-recognition of a DECT device is to send a negative response to the DECT device. The processing module 121 would then in this case implement the step 521 already explained. In one embodiment, the behaviour to be adopted in the event of non-recognition of a DECT device is to apply the method of the prior art described in relation to FIG. 4 (that is to say the steps 41 to 47).

The step 523 is followed by a step 524, during which the processing module 121 applies the behaviour to be adopted obtained in the step 523.

When the DECT device 10 is recognised by the processing module 121, the processing module 121 determines whether an update function of the SUOTA type is available for the DECT device 10. To do this, the processing module 121 checks, in the configuration information, that an update function of the SUOTA type is activated for a DECT device for which the information FMC has a value emc, the information HWvid has a value hwvid and the information SWvid has a value swvid.

If no update function of the SUOTA type is activated for the DECT device 10, the processing module 121 forms the step 521 already explained.

Otherwise the processing module 121 determines, in a step 526, whether an update is available for the DECT device 10.

The configuration information supplied by the operator comprises, for each DECT device identifiable by the value emc of its information FMC, the value hwvid of its information HWvid and the value swvid of its information SWvid, an item of information SW_UPDATE_vid. If this information is empty, no update is available for said DECT device. If this information is not empty, an update is available for said DECT device. The processing module 121 therefore examines the information SW_UPDATE_vid in order to determine whether an update is available for the DECT device 10. If an update is available (if the information SW_UPDATE_vid is not empty), the processing module 121 performs a step 527. Otherwise the processing module 121 performs a step 528.

During the step 528, the processing module 121 sends a message to the DECT device 10 in order to inform it that no update is available. In this case, the DECT device 10 will renew its attempt at updating later, for example after a predefined waiting period of 24 hours.

During the step 527, the processing module 121 determines whether it can respond to the request from the DECT device 10 with information that it possesses without involving a management server. It is said in this case that the processing module 121 implements a local processing. For this to be possible, it is necessary for the configuration information to comprise, for the DECT device 10 identified by the value emc of its information FMC, the value hwvid of its information HWvid and the value swvid of its information SWvid, a URL address FP_URL3 corresponding to the address of the software to be downloaded (i.e. the address of a download server capable of providing the required software update). In one embodiment, the download server capable of providing the required software update is the download server 18.

If the processing module 121 locally has the information for implementing a local processing, it passes to a step 53 and then to a step 57 in order to provide a response to the DECT device 10 containing the URL address FP_URL3. Otherwise it passes to the step 53 and then to a step 54 in order to implement a processing, referred to as remote processing, wherein the URL address FP_URL3 corresponding to the address of the software to be downloaded is provided by a management server different from the management server specified in the request intercepted in the step 50, i.e. the URL address url.

It should therefore be noted that, in both possible cases following the step 527, i.e. local processing and remote processing, the processing module 121 performs a redirection of the request from the DECT device 10. This is because the processing module 10 does not use the URL address url indicated in the request received in the step 50 and therefore does not approach the management server pointed to by this URL address. Either it responds itself to the request, and in this case local redirection is spoken of, or it responds by involving a management server of its choice, and in this case remote redirection is spoken of.

Returning to FIG. 5, in the case of a local redirection, in the step 53 the processing module 121 modifies the management server since it assigns itself this role. The processing module 121 then becomes the management server instead of the management server specified in the request intercepted in the step 50.

In the step 57, the processing module provides to the DECT device 10 a response to the request intercepted in the step 50. This response comprises the identifier SW_UPDATE_vid of the software to be downloaded in order to perform the update in a command CMBS_EV_DSR_SUOTA_SEND_VERS_AVAIL_RES and the URL FP_URL3 in a command CMBS_EV_DSR_SUOTA_SEND_URL_RES.

The step 57 is followed by a step 58 during which the gateway intercepts a request coming from the DECT device 10 containing a command intended to download a version of the software the identifier of which is SW_UPDATE_vid at the address FP_URL3.

In a step 59, the processing module 12 formats this request in the form of an HTTP GET command and transmits it to the address indicated in a step 60.

In the case of a remote redirection, in the step 53 the processing module 121 modifies the management server and assigns this role to a management server of its choice. In one embodiment, the management server defined by the processing module 121 has a URL address url_redirect. In the example in FIG. 1, the management server with the URL address url_redirect is the management server 16. The management server 16 replaces the management server with the URL address url specified in the request intercepted during the step 50.

In a step 54, the gateway formats the information EMC, SWvid and HWvid in an HTTP request, i.e. the gateway constructs a URL FP_URL4 such that:

FP_URL4=url_redirect?EMC=emc?SWvid=swvid?HWvid=hwvid

In a step 55, the gateway transmits the request thus constructed (by an HTTP GET command) to the management server 16, i.e. to the destination indicated by the URL FP_URL4.

In a step 56, the gateway receives a response from the management server 16 (in the form of an HTTP 200 OK command) containing an identifier SW_UPDATE_vid of the software to be downloaded in order to perform the update, and the URL address FP_URL3 corresponding to the address of the software to be downloaded (i.e. the address of a download server capable of providing the required software update).

The step 56 is followed by the steps 57, 58, 59 and 60 already explained.

It should therefore be noted that, in each type of redirection, local redirection and remote redirection, the processing module 121, and therefore the gateway 12, control the choice of the management server and of the download server that are to be used by the DECT device 10.

The invention claimed is:

1. A method for the remote management of a device connected to a local area network, said local area network ("LAN") being connected to an internet network by means of a gateway, the method comprising:

intercepting, by the gateway, a first request coming from the device comprising an address of a first server for which the first request is intended, the purpose of the first request being to obtain an address of a second server with which the device must be connected;

analysing, by the gateway, said first request in order to obtain at least one identifier of the device; and determining, by the gateway, a processing operation to be applied to said first request, from among a plurality of processing operations, according to the obtained identifier of the device and configuration information obtained from an operator of the gateway, said configuration information being a set of devices, the plurality of processing operations comprising redirection applied when the device belongs to said set of devices, comprising responding to the first request without contributing the first server and the plurality of processing operations comprising two types of redirection: (1) a local redirection where the gateway has knowledge of the address of the second server and generates its response using this address, and (2) a remote redirection where the gateway generates a second request containing the information contained in the first request, transmits the second request to a third server different from the first server, receives a response containing the address of the second server from the third server and generates its response using this address;

when the processing operation to be applied is the redirection, supplying, by the gateway, to said device a response to said first request containing the address of the second server so that the device can connect with the second server.

2. The method according to claim 1, wherein the plurality of processing operations further comprise a processing operation, called default processing, to be applied when the device does not belong to said set of devices, the default processing comprising generating a third request from the information contained in the first request, transmitting the third request to the first server, and then supplying to said device a response to said first request containing an address of a fourth server supplied by the first server so that the device can connect with the fourth server, or comprising transmitting a response to the device indicating that the first request cannot be dealt with.

3. The method according to claim 1, wherein the first request is a request to update software of the device, a redirection or a default processing being applied after verification that the gateway is able to manage update requests emanating from said device, the plurality of processing operations comprising transmitting a response to the device indicating that the request cannot be dealt with when the gateway is not able to process update requests emanating from said device.

4. The method according to claim 3, wherein, when the gateway is able to manage update requests emanating from said device, the gateway checks, using information that was previously supplied to it by the operator, that an update of the software is available, performs a redirection when an update is available or transmits a response to the device indicating that no update is available.

5. The method according to claim 1, wherein the device is a device implementing the DECT CAT iq data standard and communicating with the gateway in accordance with this standard.

6. A device included in a gateway, referred to as a gateway, interconnecting a local network to an internet network, the device comprising:

electronic circuitry configured to:

intercept a first request coming from a second device in the local network and addressed to a first server for which the first request is intended, the purpose of the first request being to obtain an address of a second server with which the second device must be connected;

analyse said first request in order to obtain at least one identifier of the second device;

determine a processing operation to be applied to said first request, from among a plurality of processing operations, according to the obtained identifier of the second device and configuration information obtained from an operator of the gateway and represents a set of second devices recognized by the gateway, said configuration information being a set of devices, the plurality of processing operations comprising redirection applied when the second device belongs to said set of second devices comprising responding to the request without contributing the first server, and the plurality of processing operations comprising two types of redirection: (1) a local redirection where the gateway has knowledge of the address of the second server and generates its response using this address and (2) a remote redirection where the gateway generates a second request containing the information contained in the first request, transmits the second request to a third server different from the first server, receives a response containing the address of the second server from the third server and generates its response using this address; and when the processing operation to be applied is the redirection, supply to said second device a response to said first request containing the address of the second server so that the second device can connect with the second server.

7. A residential gateway comprising a device according to claim 6.

8. A non-transitory storage medium storing a computer program comprising instructions for implementing, by a device, the method according to claim 1 when said program is executed by a processor of said device.

* * * * *